United States Patent [19]
Kuighadush et al.

[11] Patent Number: 5,873,621
[45] Date of Patent: Feb. 23, 1999

[54] AUTOMOTIVE WINDOW VISOR UNIT

[76] Inventors: Danny H. Kuighadush, 300 Northern Blvd. #9, Great Neck, N.Y. 11021; Massoud T. Neko, 12636 Bradford Pl., Granada Hills, Calif. 91344

[21] Appl. No.: 659,446

[22] Filed: Jun. 6, 1996

[51] Int. Cl.[6] .................................................. B60J 3/02
[52] U.S. Cl. .................................. 296/97.8; 160/DIG. 3
[58] Field of Search ................. 296/97.8, 97.4, 296/97.2; 160/370.21, DIG. 3

[56] References Cited

U.S. PATENT DOCUMENTS

| | | | |
|---|---|---|---|
| 4,241,859 | 12/1980 | Eames | 224/312 |
| 4,273,277 | 6/1981 | Stone | 224/312 |
| 4,285,554 | 8/1981 | Bell et al. | 312/9 |
| 4,326,653 | 4/1982 | Stone | 224/312 |
| 4,521,051 | 6/1985 | Cody et al. | 296/97 H |
| 4,781,409 | 11/1988 | Harbsion | 296/97.6 |
| 4,872,721 | 10/1989 | Sniadach | 296/97.2 |
| 4,874,195 | 10/1989 | Lu et al. | 296/97.2 |
| 5,004,138 | 4/1991 | Gabas | 224/312 |
| 5,010,670 | 4/1991 | Minervini | 40/593 |
| 5,197,777 | 3/1993 | Lanser et al. | 296/97.8 |
| 5,219,199 | 6/1993 | Smith et al. | 296/97.8 |
| 5,238,163 | 8/1993 | Leach | 224/312 |
| 5,281,469 | 1/1994 | Baiocchi | 428/216 |
| 5,301,856 | 4/1994 | Newsome | 224/312 |
| 5,329,947 | 7/1994 | Shikler | 132/304 |
| 5,330,085 | 7/1994 | Horensky et al. | 224/312 |
| 5,332,138 | 7/1994 | Gross et al. | 224/312 |
| 5,340,071 | 8/1994 | Fox, II | 248/231.8 |
| 5,343,568 | 9/1994 | May | 2/195.1 |
| 5,379,929 | 1/1995 | Eskandry | 224/312 |
| 5,490,708 | 2/1996 | Lee | 296/97.8 |

*Primary Examiner*—Joseph D. Pape
*Attorney, Agent, or Firm*—Sofer & Haroun, LLP

[57] ABSTRACT

An automotive window visor unit has a photochromic or tinted viewing screen slidably disposed within a longitudinal slot within the window visor such that the viewing screen is extendable from a first internal position within the window visor to a second external position protruding from the window visor. The sliding viewing screen is activated by a switch within the vehicle and when activated energizes a motor and pulley within the longitudinal slot and which controls the raising and lowering of the viewing screen from the longitudinal slot in the window visor.

8 Claims, 6 Drawing Sheets

SEC. AA

SEC. BB

SEC. CC

METAL FRAME

SEC. DD

AUTOMOTIVE WINDOW VISOR UNIT

FIELD OF THE INVENTION

This invention relates to a window visor unit for automobiles and other vehicles, and particular, to a viewing screen for shielding the driver or passenger from the glaring rays of the sun or the headlights of an oncoming vehicle.

BACKGROUND OF THE INVENTION

The glaring rays of the sun or the headlights of an oncoming automobile pose a serious hazard to a driver since the light may impair the driver's vision by causing temporary blindness and thus rendering the driver a danger to himself, his passengers and other automobiles or pedestrians on the road.

Another hazard resulting from the glare of sunlight or vehicle headlights on a driver's eyes is that the driver may be forced to remove one hand from the steering wheel so as to extend it in front of him as a shield in an attempt to block out the glaring rays. The glare of incoming light may also cause the driver to search around the vehicle for a pair of sunglasses, again causing a distraction from the concentration required when driving. Moreover, the rays of the sun, particularly in the early morning or early evening hours as the sun rises and sets, but also at all other hours during the day, may cause traffic to slow down and back up as drivers cautiously slow down because of their limited visibility.

Most automobiles and trucks manufactured today are equipped with a window visor which is rotatably mounted to the roof of the vehicle or to the support structure of the front windshield. Generally, these window visors rotate from an upward "stored" position adjacent the roof of the vehicle to a downward "open" position, such that when the window visor is in the downward position, the driver is provided with a small opaque visor or sunshade in the upper region of the front windshield. When in its downward "open" position, the sunshade may serve to partially shield the driver's eyes from a small amount of incoming sunlight directed at an angle substantially above the horizon. The sun shade does not, however, provide shielding from light directed in a straight line at the driver's eyes, nor from the rays which are reflected off the ground. Particularly, the sun shade provides no benefit for night driving when the incoming light of oncoming vehicles strike the driver's eyes from directly ahead in a straight line.

Since the window visor is rotatably mounted to the vehicle's roof or windshield support structure, when it is in its downward "open" position, it may be rotated to a side position and disposed in the plane substantially parallel to the plane of the driver's side window, such that the visor becomes a side window shade immediately to the left of the driver and may serve to block incoming light from the driver's side. However, as when the window visor is in front of the drivers when the window visor is shifted to the driver's side window, it shields the driver only from light directed from an angle substantially above the horizon. When incoming light is directed along a straight line in the driver's line of view, the window visor does not provide sufficient shielding.

Nearly all vehicles also come equipped with a sun visor mounted similarly on the front seat passenger side of the vehicle since the same problems discussed above affect the person sitting in the passenger side as well.

In addition to the manufacturer-provided window visor, others have attempted to provide vehicle add-on devices for reducing the amount of sun or the amount of headlight glare which reaches a driver's eyes. U.S. Pat. No. 5,301,856 to Newsome provides an office organizer comprising slots or pockets for holding pens, pencils, a note pad, eyeglasses and other things. The office organizer is mounted on the vehicle's window visor and provides easy access to the aforementioned accessories when the visor is in its downward or open position. In one embodiment of the Newsome device, the office organizer is provided with a series of supplemental hinged panels which are transparent and optically coated or tinted to provide protection from sunlight when they are folded down. The devices of the organizer, i.e. the pencil holders and the eyeglass pouch, etc., are also transparent and are superimposed on the transparent panels so as to permit the driver to see through the devices and the panels while reaching for the object stored on the office organizer. Unfortunately, the presence of such devices on the optically coated transparent panels impair a driver's view by further obstructing his view of the road. Furthermore, the Newsome device is bulky and may, as a result of its weight, cause the vehicles window visor to sag or fall down thus startling the driver and blocking his field of vision unexpectedly.

In U.S. Pat. No. 5,379,929 to Eskandry, there is disclosed a multi-function automobile visor unit accessory carrier for holding accessories such as eyeglasses, keys, credit cards, pens and paper items. The Eskandry accessory carrier is secured to a vehicle's window visor by elastic straps which encircle the visor. Additionally, the Eskandry device is provided with numerous layers, one of which is provided having a longitudinal slot therein and within which a tinted, planar viewing screen is disposed. To provide access to the tinted screen, a small protruding tab extends from the lower edge of the viewing screen while it is stored within the longitudinal slot. When the driver desires to utilize the viewing screen, the screen may be laterally extended from within its slot by pulling the protruding tab and lowering the screen to its desired position in front of the vehicle's occupant. In addition to the protruding tab, the lower portion of the viewing screen always protrudes beyond the lower edge of the accessory carrier. The viewing screen is provided with sawteeth which coact and interact with the terminal ends of the longitudinal slot to enable the occupant to position the viewing screen at various extension positions beyond its closed, stored position within the slot of the accessory carrier. The bulky and large size of this device and its external attachment to the vehicle's existing window visor is aesthetically unappealing. Many drivers, particularly those driving new or high end vehicles do not desire to exhibit a bulky attachment to their window visor. Furthermore, the sawteeth of the viewing screen may become worn from excessive use and may thus fail to coact with the terminal ends of the slot thus causing the viewing screen to fall from within the slot whenever the window visor is lowered. This may dangerously obstruct the driver's view unexpectedly. Furthermore, since the Eskandry visor unit attaches to the vehicle's own window visor, the weight of the accessory carrier itself may cause the window visor to sag or fall unexpectedly.

Accordingly, there is a need for a vehicle window visor which serves as a supplemental vehicle screen to filter and diminish the intensity of incoming light that reaches a driver's eyes, and avoids the disadvantages discussed above.

OBJECTS AND SUMMARY OF THE INVENTION

It is thus a general object of the present invention to provide a unitary automotive window visor unit having a viewing screen internally disposed therein to serve as a supplemental vehicle screen by filtering and diminishing the amount of incoming light which reaches a driver's eyes.

A more specific object of the present invention is to provide a unitary automotive window visor unit rotatably mounted to the interior roof or support structure of the front windshield, and having a longitudinal slot within the window visor unit and within which an internal planar viewing screen is extendable from a first internal position within the slot of the window visor unit to a second extended position protruding from the window visor unit and extending adjacent to and in front of the front windshield or side window of a vehicle, depending on the placement of the window visor unit by the driver or vehicle occupant.

It is another object of the present invention to provide a unitary automotive window visor unit having an internal planar viewing screen extendable from within a longitudinal slot in the window visor and having a motor disposed within the visor unit for electrically controlling the lowering and raising of the viewing screen into and out from the slot of the window visor unit.

It is a further object of the present invention to provide unitary automotive window visor unit having an internally extendable planar viewing screen composed of a photochromic or tinted plastic, In accordance with one aspect of the present invention, a unitary automotive window visor unit is provided having a longitudinal slot extending within the vehicle's window visor and within which a viewing screen of photochromic or tinted plastic is disposed. The viewing screen which has upper and lower surfaces is retained within the window visor by a clamp attached on its upper surface. The clamp is an integral part of the visor unit's internal pulley system. The pulley system which is also disposed within the window visor and which is mounted therein, is comprised of a motor having a motor shaft, first, second, and third pulley members, first and second cables, and the aforementioned clamp to which terminal ends of each of the cables attach. The motor receives its power from the vehicle's internal electric circuitry and may be activated by a switch placed on the exterior of the visor unit or on the vehicle's door, dashboard or anywhere else in the vehicle which is within easy reach.

When a vehicle driver desires protection from the sun or from the headlights of oncoming vehicles, the vehicle's window visor can be lowered from its upper "stored" position adjacent the roof of the vehicle to its lower "open" position adjacent the driver's position and generally within a few inches of the driver's face. To provide protection, in addition to that provided by the visor alone, the driver may activate a switch located in the vehicle which in turn energizes the motor and motor shaft within the visor unit and which rotates the pulleys and cable therein causing the photochromic or tinted viewing screen to emerge from the longitudinal slot of the window visor and extend in front of the driver's face adjacent the front windshield and within the driver's line of view. When the driver no longer desires the use of the viewing screen, he again activates the motor by moving the switch to a second position which in turn causes the motor and motor shaft to rotate in the reverse direction thus retracting the viewing screen within the visor unit. Once the viewing screen has been fully retracted into the visor unit, the vehicle's visor may then be returned to its upper "stored" position adjacent the roof of the car. If the viewing screen is composed of photochromic material, the device of the present invention may be utilized both during the day to protect from the glare of the sun and at night to protect from bright headlights in the darkness. In situations where the distracting light is entering the vehicle from the driver's side window, the hinge pivot assembly of the window visor unit permits the visor and viewing screen to be swung from its front, forward position to a side position adjacent the side window to the left of the driver.

The passenger side of a vehicle may also be provided with a window sun visor unit which may be activated by a second switch located within the vehicle. On the passenger side, the window visor unit functions identically as if it were placed on the driver's side, with the exception that the passenger side window visor unit may be swung from its front position adjacent the front windshield to its side position adjacent the passenger side window to the right of the passenger.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views.

DETAILED DESCRIPTION OF THE PRESENTLY PREFERRED EMBODIMENT

Figure 1A:
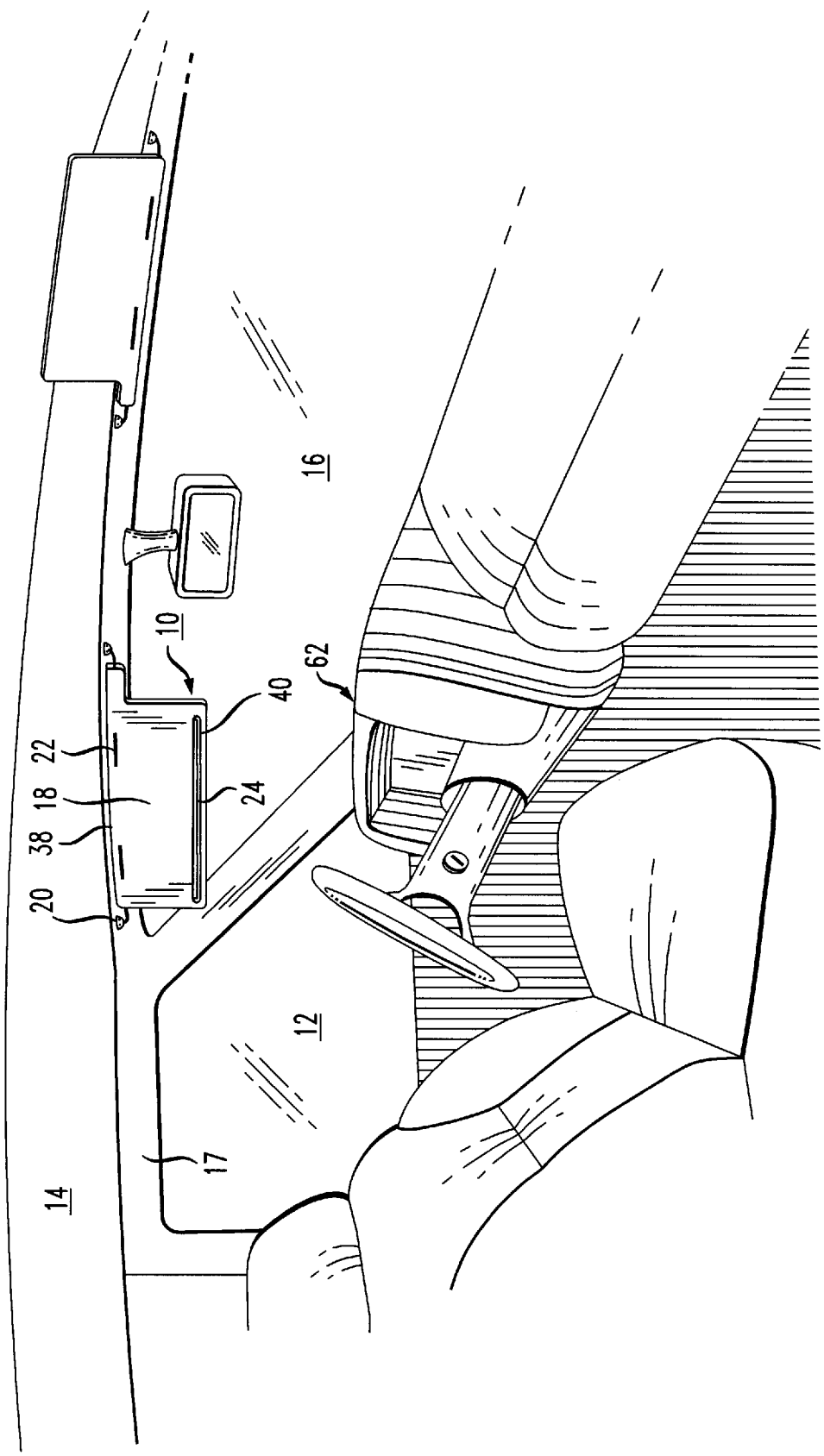
FIG. 1a illustrates an elevational, interior view of a vehicle illustrating the device of the present invention in its open position with a view screen within the window visor and located on the driver's side of the vehicle.
Figure 2:
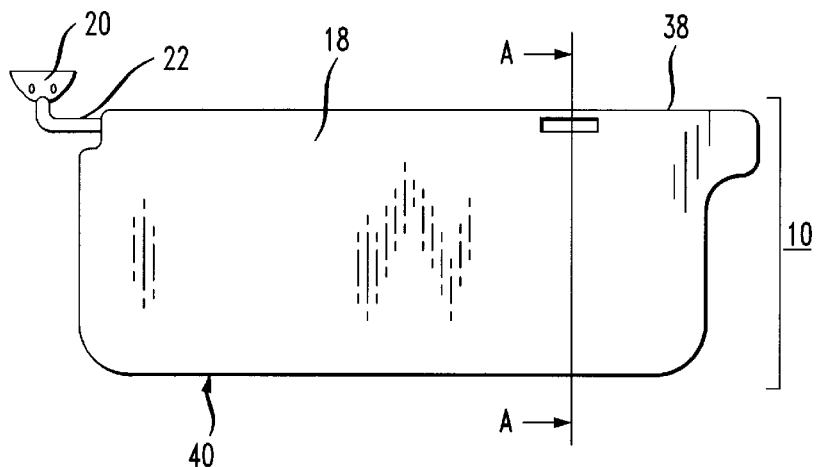
FIG. 2 illustrates a front elevational view of the presently preferred embodiment of the unitary window visor unit of the present invention.

With initial reference to FIG. 1a and FIG. 2, the unitary window sun visor unit 10 of the present invention is shown in its preferred embodiment. As illustrated, the visor unit 10 is comprised of an automobile or vehicle window visor 18 having top side 38 and bottom side 40. In most vehicles, window visor 18 is rotatably mounted to the interior roof 14 of the vehicle via a hinge 20 which is generally screwed to the roof 14 of the vehicle. A rod 22, having a first end and a second end has first end pivotably attached to hinge 20. Second end of rod 22 extends from hinge 20 and passes through top side 38 of window visor 18 and retains window visor 18 thereon for rotation between its upper "stored" position and its lower "open" position. Hinge 20 and rod 22 together comprise the vehicle's window visor pivot assembly. Hinge 20 may also attach to the interior support structure 17 of the front windshield 16.

Figure 3:
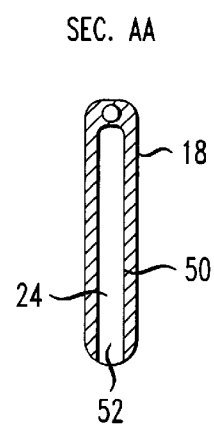
FIG. 3 illustrates a side cross-section view of the embodiment of the present invention illustrated in FIG. 2 and viewed along line A—A.
Figure 4:
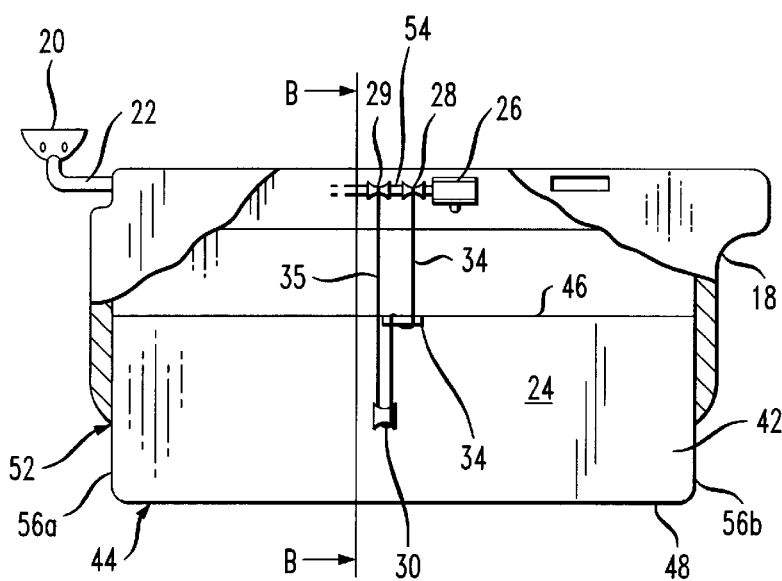
FIG. 4 illustrates a front elevational view of the presently preferred embodiment of the unitary window visor unit of the present invention cut away to illustrate the viewing screen and the internal motor and movement mechanism within the window visor.
Figure 5:
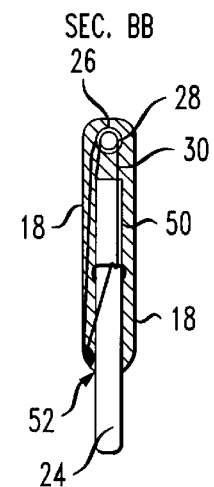
FIG. 5 illustrates a side cross-section view of the embodiment of the present invention illustrated in FIG. 4 and viewed along line B—B.

As illustrated more clearly in FIGS. 3, 4 and 5, the interior space within window visor 18 defines an internal hollow housing 50, which secures a viewing screen 24 in accordance with one embodiment of the invention. Housing 50 extends within window visor 18 from bottom side 40 to a point proximate the interior surface of top side 38 of window visor 18. Planar viewing screen 24 is of substantially the same length and width as window visor 18, and is slidably disposed in housing 50. The bottom portion of housing 50 defines a longitudinal slot 52 which allows viewing screen 24 to extend downwardly and outside visor unit 10. In use, when the vehicle's window visor 18 has been rotated to its lower "open" position adjacent the front windshield, viewing screen 24 is moveable from a first internal or "stored" position within window visor 18 to a second external or "out" position protruding from slot 52 (shown in FIG. 1b). As illustrated in FIG. 4, planar viewing screen 24 has front face 42, back face 44, sidewalls 56a, 56b, and upper portion 46 and lower portion 48.

Figure 6A:
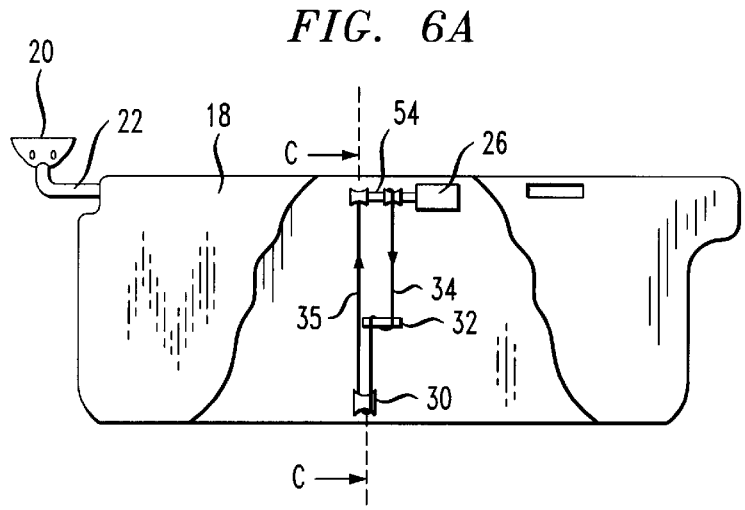
FIG. 6a illustrates a front elevational view of the presently preferred embodiment of the present invention partially cut away and partially enlarged to illustrate the individual parts comprising the internal motor and movement mechanism within the window visor.

FIGS. 4 and 6a illustrate the motor and pulley system, which control the raising and lowering of the viewing screen 24 from within slot 52 of window visor 18. However, the invention is not limited in scope to the pulley system described herein, and other means of lowering and raising viewing screen 24 from within visor unit 10 may be implemented in accordance with the principles of the present invention. Motor 26 has motor shaft 54 extending from within motor 26 and which rotates in either direction to control the raising and lowering of the viewing screen 24. Motor 26 is positioned within housing 50 and mounted to the interior of window visor 18 proximate top side 38. Motor 26, which may be energized from the vehicle's internal electrical circuitry, is turned on and off via a switch (not shown) which may be located on the exterior of window visor 18 on the vehicle's dashboard, door, or anywhere else within the vehicle which is within arm's length of the person desiring to lower or raise the viewing screen 24. As shown in FIG. 6a first pulley member 28, a second pulley member 29, a third pulley member 30, a first cable 34, a second cable 35, are all mounted within window visor 18.

Figure 7:
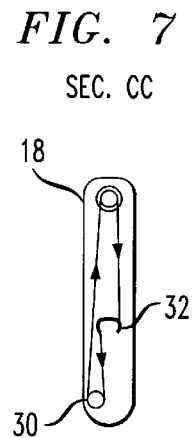
FIG. 7 illustrates a side cross-section view of the embodiment of the present invention illustrated in FIG. 6a and viewed along line C—C of FIG. 6ad.
Figure 6B:
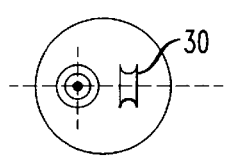
FIG. 6b illustrates an enlarged view of a third pulley member in accordance with the device of the present invention.
Figure 6C:
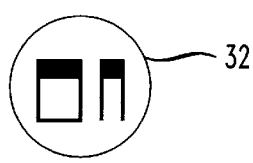
FIG. 6c illustrates an enlarged view of a clamp in accordance with the device of the present invention.
Figure 6D:
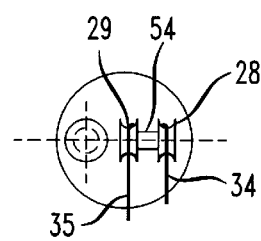
FIG. 6d illustrates an enlarged view of the pulley system attached to the motor shaft.

First pulley member 28 and second pulley member 29 are positioned on motor shaft 54. As illustrated in FIG. 6d, first pulley member 28 and second pulley member 29 are spaced apart from each other on motor shaft 54 and fixed thereon for simultaneous rotation in the direction of rotation by motor shaft 54. Third pulley member 30, shown in FIG. 6b, is secured within window visor 18 and is preferably positioned proximate bottom side 40 of window visor 18 opposite and substantially in line with second pulley 29. As shown in FIG. 6c, a clamp 32, preferably configured as an inverted "U" fits over and adheres to the upper portion 46 of viewing screen 24. A first cable 34 is connected between first pulley member 28 and clamp 32 on viewing screen 24. A second cable 35 has a first end connected to second pulley member 29. The second end of second cable 35 extends around third pulley member 30 and then attaches to clamp 32. First and second cables 34, 35 may be a fine belt such as a v-belt, string, or elastic strips, however, the invention is not limited in this respect to the composition of the cables. The invention is not, however, limited to the use of two cables. As illustrated in FIG. 7, a single cable may be utilized wherein the middle portion of the cable is attached to clamp 32 and the ends of the single cable extend between first and second pulley members 28, 29 and around third pulley member 30.

In the configuration illustrated by FIG. 4 and FIG. 6a, when viewing screen 24 is in its internal position completely within window visor 18, first pulley member 28 generally has first cable 34 wound about its periphery. Second cable 35 is generally fully extended between clamp 32 and second pulley member 29, while passing around third pulley member 30 at its extended point. When motor shaft 54 rotates, for example to lower viewing screen 24 from window visor 18, first pulley member 28 and second pulley member 29 rotate simultaneously, with first cable 34 unwinding from first pulley member 28 while second pulley member 29 simultaneously pulls second cable 35 around third pulley member 30, eventually winding second cable 35 about the periphery of second pulley member 29. When first cable 34 has been completely unwound from first pulley member 28 and second cable 35 has been fully wound about second pulley member 29, viewing screen 24 will be extended out from longitudinal slot 52 for use by the vehicle driver. Rotation of motor shaft 54 in the opposite direction to retract viewing screen 24 into slot 52 will reverse the direction of rotation of first and second pulley members 28, 29 and the windings of first and second cables 34, 35. The raising and lowering of viewing screen 24 by the rotation of first, second and third pulley members 28, 29, 30 and first and second cables 34, 35 is diagrammatically illustrated in FIGS. 6 and 7.

Figure 1B:
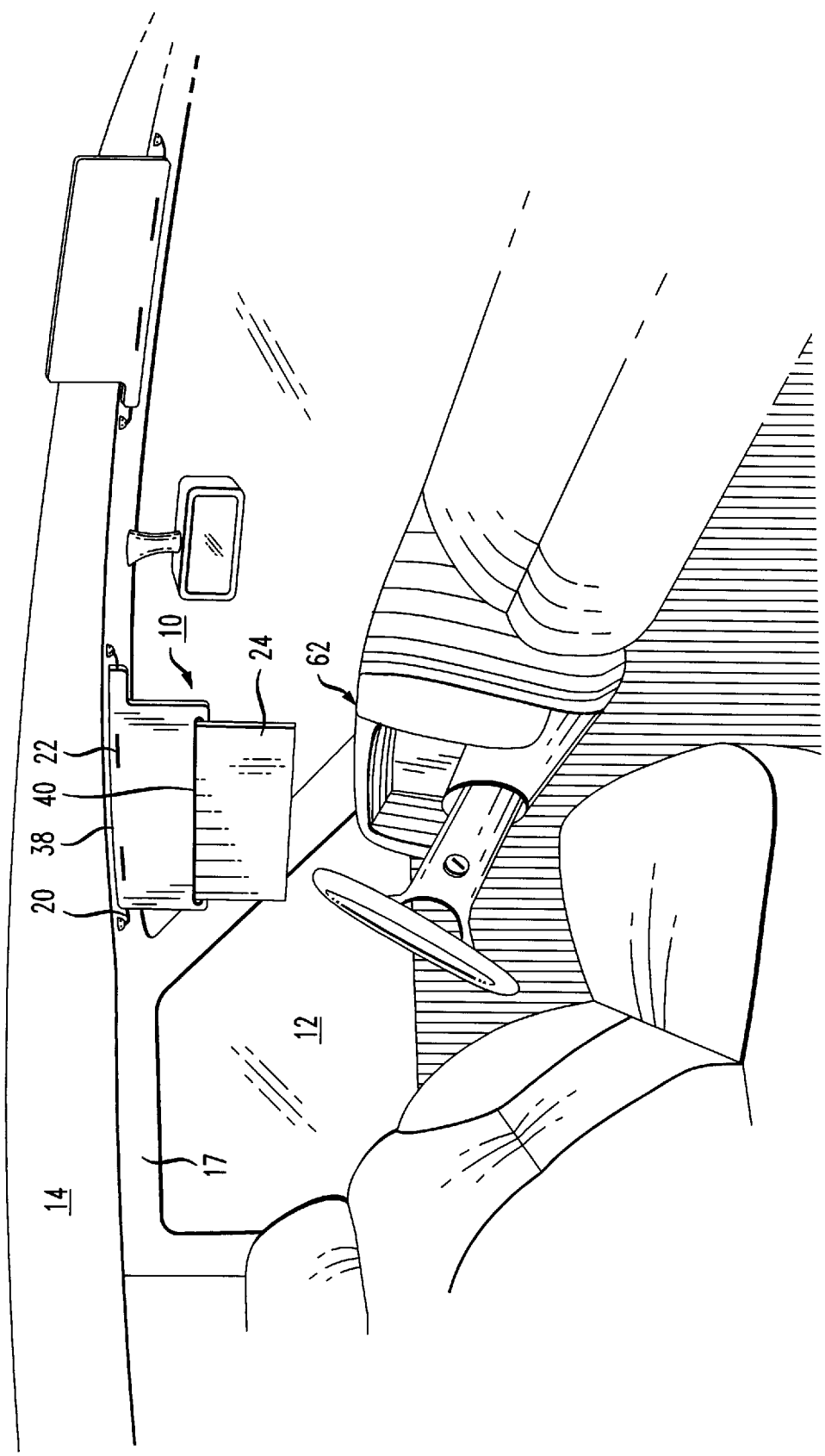
FIG. 1b illustrates an elevational, interior view of a vehicle as in FIG. 1a with the viewing screen extended from the window visor.
Figure 10:
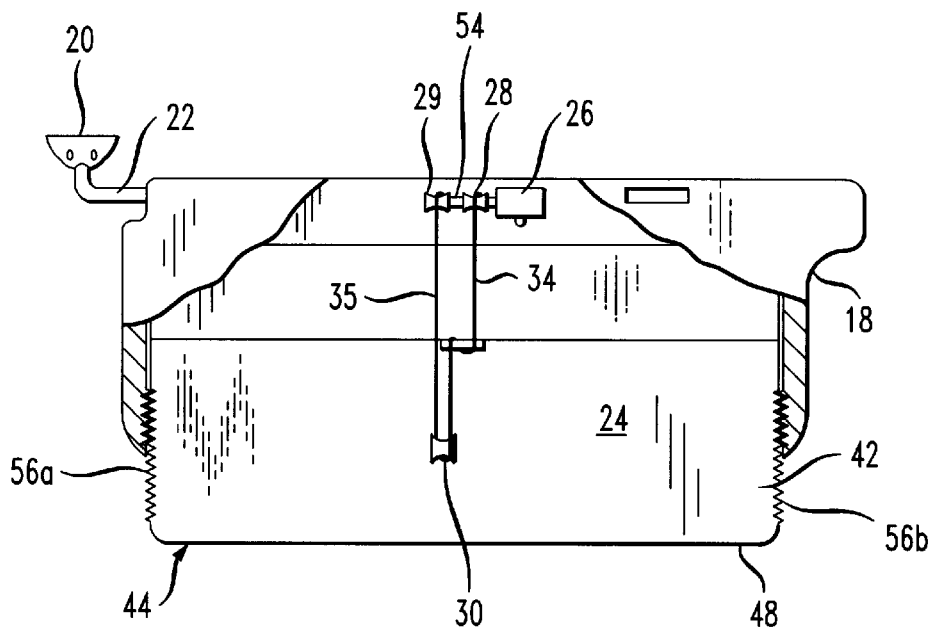
FIG. 10 illustrates an elevational view of an additional embodiment of the present invention.

Before activating the viewing screen, a driver who desires to lower viewing screen 24 first rotates window visor 18 from its upward "stored" position adjacent the roof 14 of the vehicle to its downward "open" position substantially adjacent front windshield 16 and directly in front of the driver. The driver then turns or flicks an activation switch (not shown) from its neutral position to a "down" position. Viewing screen 24 may be fully extended so that its entire length protrudes from slot 52 of window visor 18 (as shown in FIG. 1b), or it may be lowered only partially by flicking the activation switch from its "down" position back to its neutral position when viewing screen has been extended to the driver's desired length. When the driver no longer desires the use of viewing screen 24, the activation switch is moved to its "up" position which reverses the rotation of motor shaft 54 causing viewing screen to be retracted within window visor 18. As shown in FIG. 10, viewing screen 24 may optionally be provided with sawteeth along its sidewalls 56a, 56b which interact and coact with corresponding sawteeth within longitudinal slot 50. The sawteeth may provide digital or precise positioning of the viewing screen 24 from window visor 18.

Viewing screen 24 of the present invention is preferably a flexible, high quality photochromic plastic which is commercially available from any glass manufacturer such as Coming Glass Works, American Optical Corporation, and PPG Industries, Inc. in the U.S., and by Pilkington Brothers PLC, and The Plessey Company PLC in Great Britain. Photochromic plastic appears as a clear sheet which darkens upon its exposure to bright light. This quality allows the photochromic plastic viewing screen be lowered and utilized by the driver at any time and permits the viewing screen to remain extended to filter bright light when such light is directed to the driver's eyes.

If desired by the vehicle owner, viewing screen 24 may alternatively be a simple high quality tinted plastic light filter such as LEXAN plastic manufactured by General Electric. Depending upon the preference of the vehicle owner, the viewing screen 24 of tinted plastic may be supplied in a variety of colors. Other polarizing filters may also be utilized for viewing screen 24

The preferred embodiment of the present invention as disclosed hereinabove, is advantageously configured to be installed as a standard vehicle part when the vehicle is manufactured. For older and existing cars, vehicle owners who wish to install the sun visor unit of the present invention in their vehicle may purchase the window sun visor unit 10 of the present invention in an auto parts store, for instance, or from the vehicle manufacturer or discount store, etc. Installation is simple, generally requiring nothing more than removing the existing window visor by unscrewing the hinge 20 from the roof 14 or interior support structure 17 of the front windshield 16, removing the vehicle's original window visor and screwing the new window visor unit 10 of the present invention into place in substitution therefor.

Figure 8:
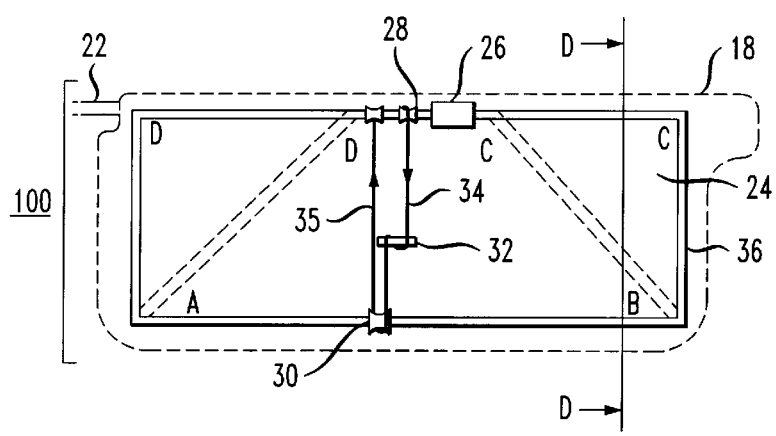
FIG. 8 illustrates a front elevational view of an alternative embodiment of the present invention with its front face cut away to reveal the internal viewing screen and motor and movement mechanism within the window visor.
Figure 9:
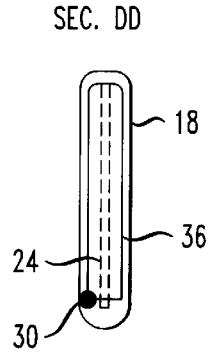
FIG. 9 illustrates a side cross-section view of the alternative embodiment of the present invention illustrated in FIG. 8 and viewed along line D—D.

If a vehicle owner does not desire to remove the existing window visor 18 and install a complete window visor unit 10, the car owner may choose to insert a viewing screen into the vehicle's existing window visor. FIGS. 8 and 9 illustrate such an alternative embodiment of the present invention which provides a window visor unit 100 of the present invention with motor 26, and first, second, and third pulley members 28, 29, 30 and first and second cables 34, 35 mounted on a frame 36 for installation into an existing window visor 18 of an older vehicle. As in the preferred embodiment discussed above, viewing screen 24 has a clamp 32 attached to its upper portion and to which second cable 35 is connected. Viewing screen 24 is positioned proximate frame 36 in parallel relation therewith. Depending upon the mounting location of the motor 26, and pulley members 28, 29, 30 thereon, the frame 36 may be rectangular or triangular as illustrated in FIG. 8. Installation of the window visor unit 100 requires the car owner to make a horizontal cut or slit (not shown) in the lower portion of the vehicle's existing window visor 18. This slit opens the window visor 18 creating an internal pocket in the window visor 18 into which frame 36 and viewing screen 24 are disposed. By attaching wires provided with window visor unit 100 to the vehicle's internal electric circuitry, window visor unit 100 illustrated in FIGS. 8 and 9 functions similarly to the presently preferred embodiment illustrated in FIGS. 1–7. Like the preferred embodiment, viewing screen 24 may be photochromic plastic or tinted plastic.

It is to be appreciated that although the device of the present invention has been described for use and/or installation for shielding incoming light which enters through the vehicle's front windshield, the device of the present invention may also be configured to be installed for use in the rear of a vehicle so as to diminish the amount of incoming light which enters the vehicle through the rear windshield and rear side windows.

Figure 11:
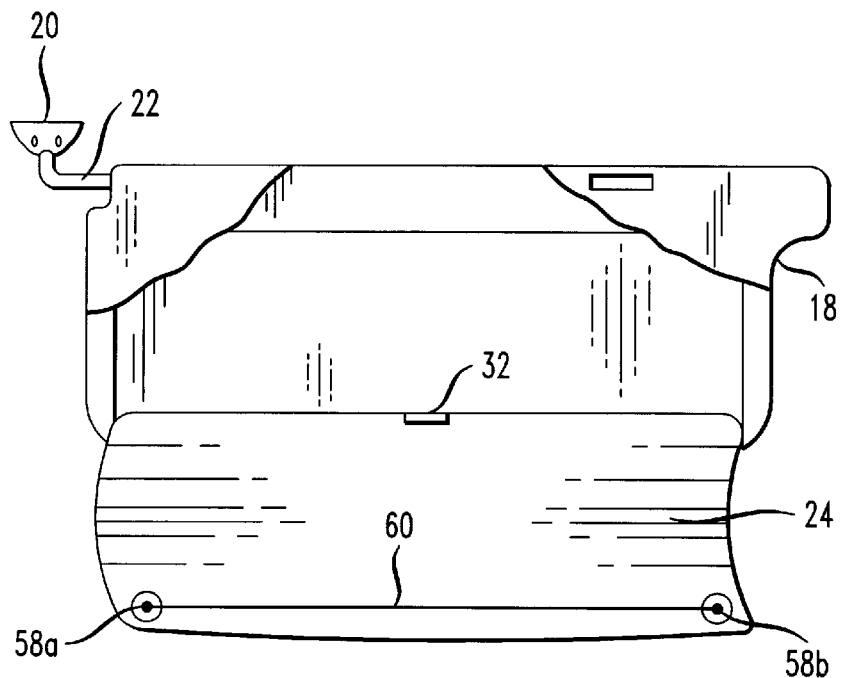
FIG. 11 illustrates an elevational view of another embodiment of the present invention.

In accordance with another embodiment of the present invention, viewing screen 24 may advantageously be folded or bent to provide additional protection against incoming light. As illustrated in FIG. 11, viewing screen 24 may be provided with small knobs or dials 58a, 58b in the lowermost comers of the viewing screen 24. A rubber band, elastic string or thin cable 60 may be connected between these knobs on both the front face 42 and the back face 44 of the viewing screen 24. By turning both knobs inward or outward simultaneously, viewing screen 24 may be flexed or curved inward or outward depending on the direction the dials are turned. Curving the viewing screen 24 causes refraction of the incoming light wave and directs the path of light at an angle upward or downward and away from the eye. The ability to flex or curve viewing screen 24 provides additional protection from the incoming light which works in conjunction with the photochromic or tinted plastic used for the viewing screen 24.

Figure 12:
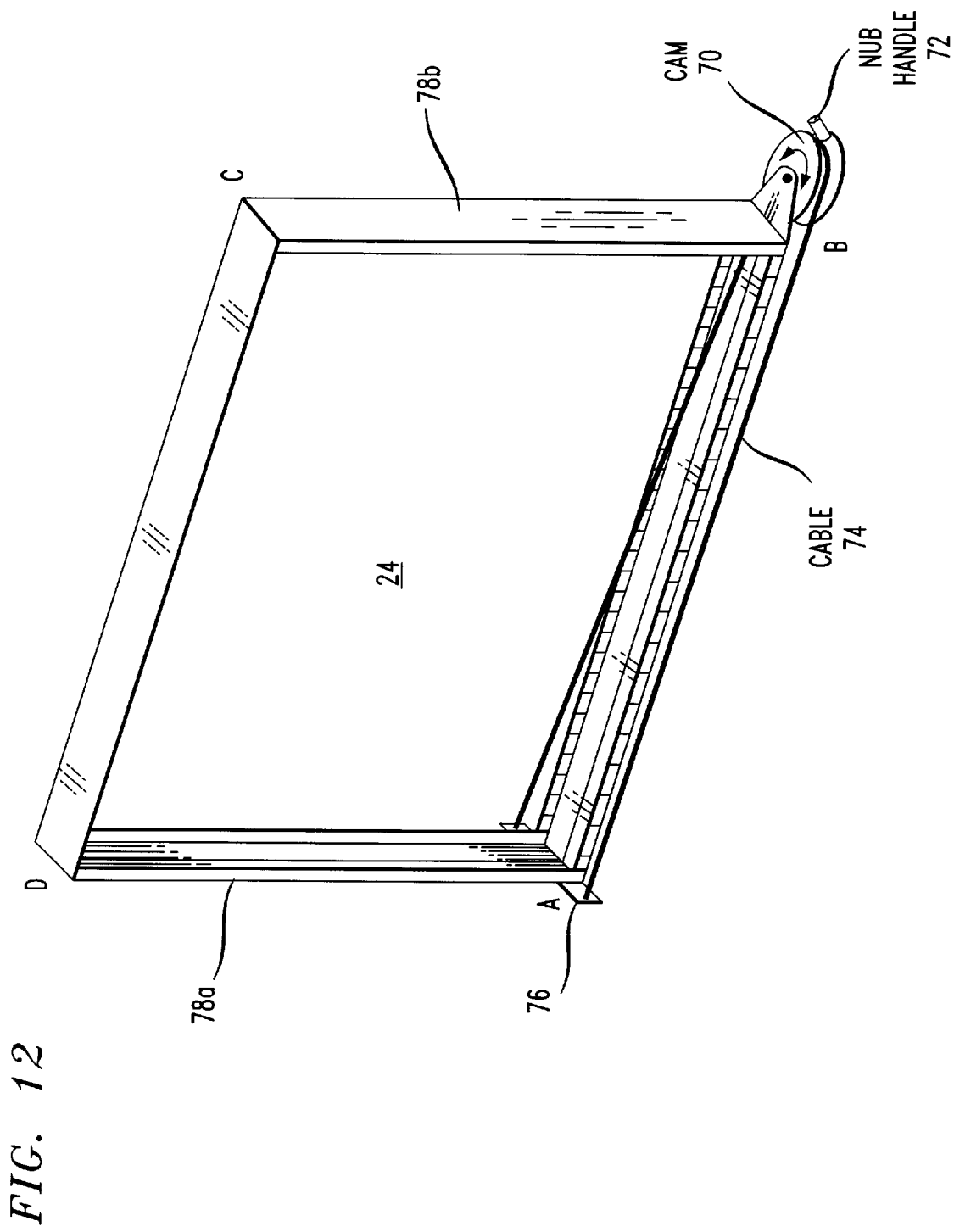
FIG. 12 illustrates a perspective view of an alternative embodiment of the present invention.

Alternatively, as illustrated in FIG. 12, viewing screen 24 may be provided with side brackets 78a, 78b. Viewing screen 24 may further be configured to include a cam 70 rotatably attached to a lower corner B of side bracket 78b. On lower comer A of side bracket 78a a small bracket bar 76 is affixed and which has holes therein through which a thin strong cable 74 passes through. Cable 74 extends from bracket bar 76 on both sides of viewing screen 24 around cam 70 and is affixed thereto. Nub handle 72 protrudes from cam 70 and facilitates rotation of cam 70 in either direction. Moving nub handle 72 in either direction rotates cam 70 and causes the extension or tightening of cable 74 which bends or flexes viewing screen 24 in a concave or convex manner depending upon the direction cam 70 is rotated. The concave or convex bending of viewing screen 24 permits the refraction of incoming light which directs the path of the incoming rays at an angle upward or downward and away from the driver's line of sight.

In another embodiment of the present invention, the window visor unit 10 illustrated in FIGS. 1–7 is installed in new vehicles as previously explained. Additionally, a new vehicle may be provided with light sensing means 62, as illustrated in FIGS. 1a and 1b, placed within the vehicle, preferably on the dashboard or on the rear-view mirror. The light sensing means may be provided with a microprocessor or an adjustment mechanism for programming or pre-setting the window visor to activate at certain light sensitivities. When the light sensing means detects a light sensitivity at one or more of its preset levels, window visor 18 is automatically shifted downward and the viewing screen 24 is automatically lowered to its second position adjacent front windshield 16. When the light sensing means detects that the viewing screen is no longer needed, viewing screen 24 is retracted into its first upper position within window visor 18. Window visor 18 is then automatically raised to its upward position adjacent the roof 14 of the vehicle. Viewing screen 24 may alternatively be returned to its first position by activating the switch within the automobile.

Although the embodiment of the present invention has been described with reference to its use and installation in automobiles, it may be installed and utilized equally well in all other vehicles such as trucks.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. An automotive window visor unit comprising:
    a window visor having surrounding wall configured to define an internal housing, wherein said housing defines a lower portion having a bottom opening;
    a planar viewing screen disposed within said housing and configured to move in and out of said window visor;
    a rotating shaft disposed along the internal width of said window visor for moving said planar viewing screen; and
    a pulley system having a first pulley member disposed on said rotating shaft for rotation thereon, a second pulley member disposed a fixed distance downstream from said second pulley member on said rotating shaft, said second pulley member being disposed on said rotating shaft for rotation thereon simultaneous with said first pulley member, a third pulley member, said third pulley member being fixed to said window visor within said internal housing.

2. An automotive window visor unit in accordance with claim 1, wherein said bottom opening is a slot for allowing movement of said planar viewing screen in and out of said slot.

3. An automotive window visor unit in accordance with claim 1, further comprising a clamp fixedly attached to said planar viewing screen.

4. An automotive window visor unit in accordance with claim 1, wherein said movement of said planar viewing screen is controlled by a motor, said motor controlling the rotation of said rotating shaft.

5. An automotive window visor unit in accordance with claim 4 said planar viewing screen is made of a photochromatic plastic that darkens upon its exposure to bright light.

6. An automotive window visor unit in accordance with claim 4, wherein said motor moves said planar viewing screen via said pulley system.

7. An automative window visor unit in accordance with claim 1 wherein said third pulley member is arranged within said internal housing opposite and substantially in line with said second pulley member in a fixed spaced apart relation.

8. An automotive window visor unit, comprising:
    A window visor having surrounding walls configured to define an internal housing, said window visor having a top side, a bottom side, and a visor pivot assembly having a hinge and a rod, said visor positioned on said rod of said visor pivot assembly adjacent a vehicle window and rotatably mounted in said vehicle with respect to said window, said window visor having a predetermined thickness;
    a planar viewing screen disposed within said housing, said planar viewing screen having an upper portion, a lower portion, first and second sidewalls, and front and back faces, said planar viewing screen being extendable from a position substantially within said housing of said window visor through a complimentary longitudinal slot within said window visor, said planar viewing screen being slidably disposed within said longitudinal slot of said window visor unit so as to permit extraction and retraction of said planar viewing screen from a first, upper position within said window visor unit to a second, lower position extending out from said bottom side of said window visor unit;
    a two-way directional motor fixed to said window visor unit within said housing of said window visor unit, said motor having a rotatable motor shaft extending horizontally therefrom,
    a first pulley member disposed on said motor shaft for rotation thereon;
    a second pulley member disposed a fixed distance downstream from said first pulley member on said motor shaft, said second pulley member being disposed on said motor shaft for rotation thereon simultaneous with said first pulley member;
    a third pulley member, said third pulley member being fixed to said window visor within said housing proximate bottom side of said window visor unit, said third pulley member arranged within said housing of said window visor unit opposite and substantially in line with said second pulley member in fixed space apart relation;
    a clamp attached to said upper portion of said viewing screen; and
    a cable of fixed length having two ends, said ends being fixed to said first and second pulley members, wherein a portion of said cable extends around said third pulley member, and wherein said cable is fixed to said clamp at a point central between said first and second ends.

* * * * *